United States Patent
Jeon (10) Patent No.: US 11,039,498 B2
(45) Date of Patent: Jun. 15, 2021

(54) TRANSMISSION CONTROL METHOD OF CONNECTION CONFIRMATION DATA PACKETS AND TERMINAL

(71) Applicant: FCI INC, Bundang-gu (KR)

(72) Inventor: Hyo Won Jeon, Bundang-gu (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 15/972,264

(22) Filed: May 7, 2018

(65) Prior Publication Data

US 2018/0324892 A1 Nov. 8, 2018

(30) Foreign Application Priority Data

May 8, 2017 (KR) .......................... 10-2017-0057568

(51) Int. Cl.
| | |
|---|---|
| H04W 76/28 | (2018.01) |
| H04L 1/18 | (2006.01) |
| H04W 52/02 | (2009.01) |
| H04W 52/28 | (2009.01) |
| H04L 29/08 | (2006.01) |

(52) U.S. Cl.
CPC ............ *H04W 76/28* (2018.02); *H04L 1/189* (2013.01); *H04L 1/1887* (2013.01); *H04W 52/02* (2013.01); *H04W 52/286* (2013.01); *H04L 67/145* (2013.01)

(58) Field of Classification Search
CPC ... H04L 1/1887; H04L 1/1822; H04L 5/0055; H04L 1/1819; H04L 1/1825; H04L 5/0053; H04L 67/145; H04L 67/14; H04L 43/0811; H04L 43/10; H04L 61/2553
See application file for complete search history.

(56) References Cited

U.S. PATENT DOCUMENTS

| | | | |
|---|---|---|---|
| 7,899,921 B2 | 3/2011 | Hill et al. | |
| 9,736,050 B2 | 8/2017 | Gatta et al. | |
| 2004/0205189 A1* | 10/2004 | Sata | G07C 9/00309 |
| | | | 709/225 |

(Continued)

FOREIGN PATENT DOCUMENTS

| | | |
|---|---|---|
| CN | 1737497 B | 11/2011 |
| CN | 102970155 B | 8/2016 |
| KR | 20150049287 A | 5/2015 |

OTHER PUBLICATIONS

Texas Instruments, SimpleLinkTM CC3100/CC3200 Wi-Fi Internet-on-a-chipTM Networking Sub-system Power management, Application Report, SWRA462, Sep. 2014.

(Continued)

*Primary Examiner* — Asad M Nawaz
*Assistant Examiner* — Najeeb Ansari
(74) *Attorney, Agent, or Firm* — Saile Ackerman LLC; Stephen B. Ackerman (57) ABSTRACT

In a transmission control method of connection confirmation data packets and a terminal, the terminal can optionally adjust time intervals of the connection confirmation data packets in re-transmissions to a wireless network device for keeping the data link between the wireless network device and the terminal, such that the time intervals are not kept at a fixed time interval but at adjustable time intervals.

9 Claims, 5 Drawing Sheets

(56) References Cited

U.S. PATENT DOCUMENTS

| | | | |
|---|---|---|---|
| 2007/0202837 A1* | 8/2007 | Araki | H04W 52/0225 |
| | | | 455/343.3 |
| 2011/0131308 A1 | 6/2011 | Eriksson | |
| 2012/0008536 A1 | 1/2012 | Tervahauta | |
| 2014/0269359 A1* | 9/2014 | Roskind | H04L 43/0882 |
| | | | 370/252 |
| 2014/0328260 A1* | 11/2014 | Papasakellariou | |
| | | | H04W 72/1289 |
| | | | 370/329 |
| 2015/0103710 A1* | 4/2015 | Lv | H04W 74/0816 |
| | | | 370/311 |
| 2018/0242315 A1* | 8/2018 | Sun | H04W 72/0446 |

OTHER PUBLICATIONS

"Configuring TCP KeepAlive Values to Improve WAN Links and ICA KeepAlives to Place ICA Session in a Disconnected State," Citrix, CTX708444, Article created: Feb. 6, 2014, Found: Sep. 16, 2020, 3 pages, https://support.citrix.com/article/CTX70844.

Chinese Office Action, Application No. 201810063013.1, Applicant: Dialog Semiconductor Inc., dated Aug. 5, 2020, 17 pages.

"TCP connection status and closing method, and its impact on Server and Client," Sep. 6, 2020, 2 pages, https://www.cnblogs.com/fczjuever/archive/2013/04/05/3000697.html.

* cited by examiner

TRANSMISSION CONTROL METHOD OF CONNECTION CONFIRMATION DATA PACKETS AND TERMINAL

CROSS REFERENCE TO RELATED APPLICATION

This application claims the priority to Korean Patent Application No. 10-2017-0057568, filed on May 8, 2017 and entitled "TRANSMISSION CONTROL METHOD OF CONNECTION CONFIRMATION DATA PACKETS AND TERMINAL." The entire disclosure of the above application is incorporated herein by reference.

BACKGROUND

Field

The present disclosure relates to a transmission control method of connection confirmation data packets and a terminal, and more particularly relates to a transmission control method of connection confirmation data packets and an terminal that are implemented in a wireless fidelity (WIFI) communication environment and can avoid burst errors of a wireless communication, such that the transmission control method and the terminal have maximum power consumption efficiency.

Background

Generally, work stations operate in a basic service set (BSS) that is a component of a wireless local area network (WLAN) architecture. On one hand, the work stations transmit connection confirmation packets during a preset period, where the connection confirmation packets are defined as keep-alive packets, such that data links between the work stations and an access point (AP) are kept alive. When the connection confirmation packets are transmitted in the preset period, and the work stations support a low-power mode, the low-power mode is changed to an active mode for transmitting the connection confirmation packets.

On the other hand, when the work stations cannot normally receive acknowledge (ACK) responses from the AP, the work stations continuously transmit connection confirmation packets again to the AP according to a preset number. If the work stations cannot receive the acknowledge (ACK) responses from the AP yet based on the connection confirmation packets, data links between the work stations and an access point (AP) are disconnected. Afterwards, the work stations exit from the low-power mode and enter the active mode, and an AP search process is then carried out again.

Under a condition of wireless communication with relatively large dependence on electric wave quality (e.g., signal having low or higher noise), when the work stations operate in burst error having random characteristics, transmission of connection confirmation packets and conversion of the active mode once again occur frequently. Thus, this situation downgrades power consumption efficiency of the work stations that supports the low-power mode.

Therefore, there is a need to avoid burst errors of devices in the condition of wireless communication, such that the power consumption efficiency can be greatly improved.

SUMMARY OF DISCLOSURE

Embodiments of the present disclosure provide a transmission control method of connection confirmation data packets and a terminal, such that the terminal can optionally adjust time intervals of the connection confirmation data packets in re-transmissions to a wireless network device for keeping the data link between the wireless network device and the terminal, such that the time intervals are not kept at a fixed time interval but at adjustable time intervals.

A first aspect of an embodiment in the present disclosure provides a terminal. The terminal includes at least one processor and a memory connected with the at least one processor, where the memory comprises the at least one program instruction and the at least one processor executes a method of the at least one program instruction. The method includes transmitting connection confirmation data packets to the wireless network device, and receiving response data packets corresponding to the connection confirmation data packets from the terminal. The connection confirmation data packets are used to keep data links between the terminal and the wireless network device alive. The at least one program instruction further includes determining whether the terminal is configured to receive the response data packets from the wireless network device responsive to the connection confirmation data packets, where the terminal is configured to re-transmit the connection confirmation data packets within a preset re-transmission number to the wireless network device when the terminal receives no response data packet, such that the terminal adjusts a transmission characteristic of the connection confirmation data packets, where the transmission characteristic is defined as transmission time intervals of the connection confirmation data packets.

In an embodiment of the terminal, the method further includes following operations. One conversions of a low power mode and an active mode of the terminal is managed, and data links between the terminal and a wireless network device that is not kept alive is determined when the terminal receive no response data packet, such that the terminal changes a mode from the low-power mode to the active mode.

In an embodiment of the terminal, the method further includes following operations. Variable parameters corresponding to the transmission characteristic of the connection confirmation data packets are stored in the memory. At last one of the variable parameters based on selection information input by a user is computed, and the transmission characteristic based on the at last one of the variable parameters are adjusted.

In an embodiment of the terminal, the method further includes following operations. Power efficiency of the terminal is determined, when adjusting the transmission characteristic according to variable parameters, and the transmission characteristics are adjusted according to a determination result of the power efficiency based on at least one of variable parameters.

In an embodiment of the terminal, the method further includes following operations. Transmission time intervals of the connection confirmation data packets in re-transmissions to the wireless network device based on computed variable parameters are adjusted.

In an embodiment of the terminal, the method further includes following operations. The transmission time intervals are adjusted by a relationship that the transmission time intervals are gradually increased and positively related to the preset re-transmission number of the connection confirmation data packets in the re-transmissions.

In an embodiment of the terminal, the method further includes following operations. The connection confirmation data packets at a maximum transmission time interval in a first re-transmission based on computed variable parameters are transmitted, and after the first re-transmission, transmitting the connection confirmation data packets to the wireless network device at a fixed transmission time interval in next re-transmissions.

In an embodiment of the terminal, the method further includes following operations. The connection confirmation data packets at a random transmission time interval in the re-transmissions based on computed variable parameters are transmitted to the wireless network device.

In a second aspect of an embodiment of the present disclosure, a transmission control method of connection confirmation data packets includes following operations. A terminal transmits the connection confirmation data packets to a wireless network device, where the connection confirmation data packets are used to keep data links between the wireless network device and the terminal alive. The terminal determines whether to receive the response data packets from the wireless network device responsive to the connection confirmation data packets. The terminal re-transmits the connection confirmation data packets to the wireless network device within a preset re-transmission number when the terminal receives no response data packet, such that the terminal continuously adjusts a transmission characteristic of the connection confirmation data packets.

In an embodiment of the transmission control method of connection confirmation data packets, the transmission control method further includes storing variable parameters corresponding to the transmission characteristic of the connection confirmation data packets, where the terminal is configured to compute at last one of the variable parameters based on selection information input by a user. The transmission control method further includes adjusting the transmission characteristic based on the at last one of the variable parameters.

In an embodiment of the transmission control method of connection confirmation data packets, the transmission control method further includes adjusting transmission time intervals of the connection confirmation data packets in re-transmissions based on computed variable parameters.

In an embodiment of the transmission control method of connection confirmation data packets, the transmission control method further includes adjusting the transmission time intervals by a relationship that the transmission time intervals are gradually increased and positively related to the preset re-transmission number of the connection confirmation data packets in the re-transmissions.

In an embodiment of the transmission control method of connection confirmation data packets, the transmission control method further includes transmitting the connection confirmation data packets at a maximum transmission time interval in a first re-transmission based on computed variable parameters. After the first re-transmission, the connection confirmation data packets are transmitted to the transmission control method further at a fixed transmission time interval in next re-transmissions.

In an embodiment of the transmission control method of connection confirmation data packets, the transmission control method further includes transmitting the connection confirmation data packets to the wireless network device at a random transmission time interval in the re-transmissions based on computed variable parameters.

BRIEF DESCRIPTION OF DRAWINGS

The following embodiments refer to the accompanying drawings for exemplifying specific implementable embodiments of the present disclosure. It should be noted that the following drawing are exemplary embodiments and persons of ordinary skill in the art, without paying any creative effort, can obtain other drawings based on these drawings, where.

DETAILED DESCRIPTION OF PREFERRED EMBODIMENTS

The following embodiments refer to the accompanying drawings for exemplifying specific implementable embodiments of the present disclosure in a suitable computing environment, where similar numerals denote the same elements. It should be noted that the exemplary described embodiments are configured to describe and understand the present disclosure, but the present disclosure is not limited thereto.

Figure 1:
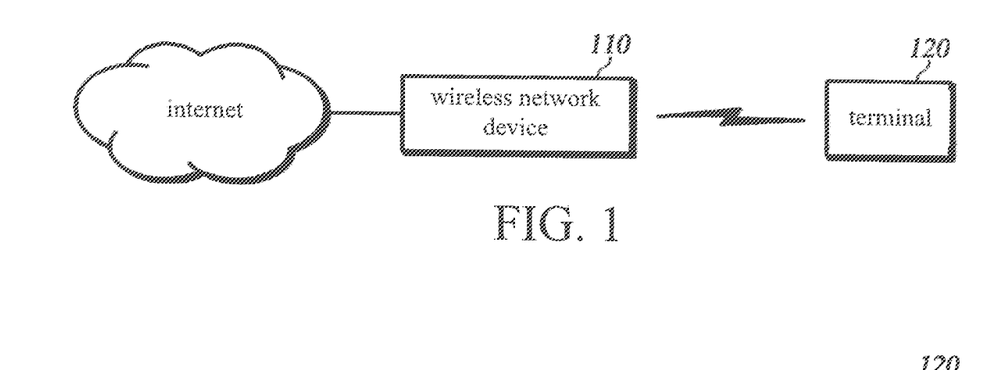
FIG. 1 is an illustrative diagram of a wireless network system according to one embodiment of the present disclosure.

FIG. 1 is an illustrative diagram of a wireless network system according to one embodiment of the present disclosure. The wireless network system includes a wireless network device 110 and a terminal 120. In an embodiment, it is noted that the wireless network system only includes the wireless network device 110 and the terminal 120, but is not necessarily limited thereto.

In an embodiment, the wireless network device 110 includes a function of a network address translation (NAT), such that the terminal 120 connected to the wireless network device 110 can utilize internet. In other words, the wireless network device 110 is configured to receive a wire network signal from an internet service provider (ISP), where the wire network signal is converted into a wireless signal that is output to the terminal 120, such that a wireless network environment is implemented. In an embodiment, the wireless network device 110 is configured to construct the wireless network environment using communication standards or protocols that are compatible to a protocol of Institute of Electrical and Electronic Engineers (IEEE) 802.11 (e.g., a wireless local area network including near-field communication protocol and wireless fidelity (WIFI) communication protocol). The terminal 120 connects with the wireless network environment using the wireless network device 110, and is configured to receive data from internet and transmit data to the internet in the wireless network environment.

In an embodiment, when the wireless network device 110 constructs a data link with the terminal 120, the wireless network device 110 is configured to receive the connection confirmation data packets from the terminal 120 at a fixed period (e.g., a fixed reception cycle), where the connection confirmation packets are defined as keep-alive packets. For example, the connection confirmation packets are defined as information that is mutually transmitted among devices, and used to assure the data link between the wireless network device 110 and the terminal 120 that are normally operated, or to prevent the data link from being disconnected.

When the wireless network device 110 is configured to receive the connection confirmation data packets from the terminal 120, the wireless network device 110 is configured to transmit response data packets corresponding to the connection confirmation data packets to the terminal 120, such that the connection confirmation data packets are used to keep data links between the wireless network device 110 and the terminal 120 alive. The terminal 120 connects with the wireless network environment via the wireless network device 110, and is configured to receive data from internet and transmit the data to the internet in the wireless network environment.

The terminal 120 is configured for receiving various data from network and for transmitting various data to a network while operating a key by a user. In an embodiment, the terminal 120 is one selecting from a group consisting of a tablet personal computer (PC), a laptop PC, a personal computer (PC), a smart phone, a personal digital assistant (PDA), and a mobile communication terminal.

In an embodiment, when the terminal 120 constructs a data link with the wireless network device 110, the terminal 120 is configured to generate the connection confirmation data packets and transmits connection confirmation data packets to the wireless network device 110 at a fixed period (e.g., a fixed transmission cycle), such that the terminal 120 keeps the data link alive. For example, when the terminal 120 does not receive form the wireless network device 110 and transmit data to the wireless network device 110 via the data link in a preset time interval, the terminal 120 is configured for transmitting connection confirmation data packets to the wireless network device 110.

The terminal 120 is configured for detecting whether to receive the response data packets corresponding to the connection confirmation data packets from the wireless network device 110.

When the terminal 120 receives no response data packet from the wireless network device 110 corresponding to the connection confirmation data packets based on a detection result, the terminal 120 is configured to re-transmit connection confirmation data packets to the wireless network device 110. For example, in a transmission period of connection confirmation data packets, the terminal 120 is configured to re-transmit a preset number of connection confirmation data packets to the wireless network device 110.

In an embodiment, the terminal 120 is configured to variably (e.g., dynamically or adaptively) adjust the transmission characteristics of connection confirmation data packets in re-transmissions. For example, the transmission characteristics are defined as time intervals of the connection confirmation data packets in the re-transmissions.

In other words, the terminal 120 can optionally adjust the time intervals of the connection confirmation data packets in the re-transmissions to the wireless network device 110 for keeping the data link between the wireless network device 110 and the terminal 120, such that the time intervals are not kept at a fixed time interval but at adjustable time intervals.

Figure 2:
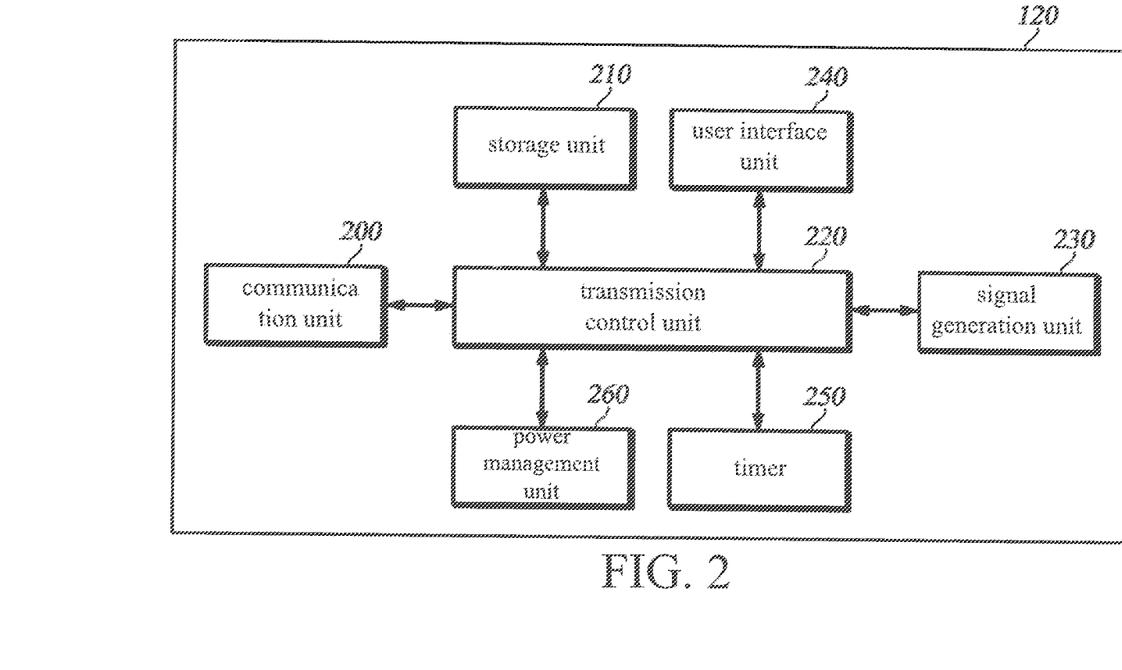
FIG. 2 is an illustrative block diagram of a terminal according to one embodiment of the present disclosure.

FIG. 2 is an illustrative block diagram of a terminal according to one embodiment of the present disclosure. In detail, the terminal 120 is configured for variably adjusting the time intervals of the connection confirmation data packets in the re-transmissions.

If the terminal 120 does not receive response data packets from the wireless network device 110 when the terminal 120 re-transmits a preset number of connection confirmation data packets to the wireless network device 110, the data link between the terminal 120 and the wireless network device 110 is defined as a disconnection state. Afterwards, the terminal 120 is configured to search process for connectable wireless network devices again.

The terminal 120 supports a low power mode that is defined as a power-saving function, where the power-saving function corresponding to a part of functions performed by the terminal 120 decreases power consumption of the terminal 120.

For example, when the terminal 120 does not construct a data link with the wireless network device 110 in a preset period for receiving no response data from the wireless network device 110 and transmitting data packets to the wireless network device 110, the terminal 120 operates in the low power mode.

When the connection confirmation data packets are in a transmission period, the terminal 120 is configured for temporarily converting the low power mode into an active mode, and transmits the connection confirmation data packets to the wireless network device 110 using the active mode.

When the terminal 120 receives no response data packet, corresponding to the connection confirmation data packets, from the wireless network device 110, the terminal 120 is configured to transmit connection confirmation data packets to the wireless network device 110 in re-transmissions. For example, if the terminal 120 re-transmits a preset number of connection confirmation data packets to the wireless network device 110, and the terminal 120 yet receives no response data packet, corresponding to connection confirmation data packets in the re-transmissions, from the wireless network device 110, the terminal 120 is configured for switching the low power mode into the active mode.

Under a condition of wireless communication with relatively large dependence on electric wave quality, when terminals operate in burst error having random characteristics, transmission of connection confirmation packets and conversion of the active mode once again occur frequently. Thus, this situation downgrades power consumption efficiency of the terminals that supports the low-power mode. Embodiments of the present disclosure, the terminal 120 can optionally adjust time intervals of the connection confirmation data packets that is for keeping the data link between the wireless network device 110 and the terminal 120, such that the time intervals are not kept at a fixed time interval but at adjustable time intervals. The terminal 120 can avoid burst errors of a wireless communication, and thus reduces a number of active mode conversions, such that the terminal 120 have maximum power consumption efficiency.

FIG. 2 is an illustrative block diagram of a terminal according to one embodiment of the present disclosure. The terminal 120 includes a communication unit 200, a storage unit 210, a transmission control unit 220, a signal generation unit 230, a user interface unit 240, a timer 250, and a power management unit 260.

The communication unit 200 connects with network, such that the terminal 120 can access network resources and provide service content to users.

The communication unit 200 is configured to transmit the connection confirmation data packets to the wireless network device that are used to keep data links between the terminal 120 and a wireless network device 110 alive, and receives response data packets corresponding to the connection confirmation data packets from the wireless network device.

The storage unit 210 is configured to store information that controls transmissions of the connection confirmation data packets.

In an embodiment, when the terminal 120 re-transmits the connection confirmation data packets to the wireless network device 110, the storage unit 210 is configured for storing variable parameters corresponding to transmission characteristics of the connection confirmation data packets. For example, the variable parameters are defined as setting values of transmission time intervals of the connection confirmation data packets.

In an embodiment, the storage unit 210 is configured for storing variable parameters corresponding to preset conditions, where the preset conditions are defined as various kinds of channels having signal strength in the wireless network environment. For example, the storage unit 210 collects the variable parameters that are matched with the channels having different signal strength.

In an embodiment, the storage unit 210 is configured for storing power efficiency values of the terminal 120 that are used to adjust transmission characteristics based on variable parameters. For example, the storage unit 210 collects information that matches the power efficiency values of the terminal 120 with the variable parameters and can be modified.

The transmission control unit 220 is configured for controlling outputs of the connection confirmation data packets to the wireless network device 110.

In an embodiment, when the wireless network device 110 constructs a data link with the terminal 120, the transmission control unit 220 determines that the wireless network device 110 is configured to receive the connection confirmation data packets from the terminal 120 at a fixed period for keeping the data link alive.

The transmission control unit 220 determines whether the terminal 120 receives response data packets corresponding to the connection confirmation data packets from the wireless network device 110, and re-transmits the connection confirmation data packets to the wireless network device 110 within a preset transmission number based on a determination result.

In an embodiment, the transmission control unit 220 of the terminal 120 variably adjusts the transmission characteristics of connection confirmation data packets in the re-transmissions based on different conditions.

A method of the transmission control unit 220 that adjusts the transmission characteristics of connection confirmation data packets in the re-transmissions is described below.

The transmission control unit 220 adjusts the transmission characteristics of re-transmission connection confirmation data packets based on the variable parameters in the storage unit 210. For example, the transmission control unit 220 determines current conditions based on detection results of the wireless channels, and computes variable parameters corresponding to the current conditions for adjusting transmission characteristics. In an embodiment, the transmission control unit 220 includes functional elements that collect information of the wireless channels. For example, the terminal 120 includes a collection unit that collects information of the wireless channels. In an embodiment, a method of collecting information of the wireless channels by the transmission control unit 220 is same as a method of collecting information of the wireless channels by the terminal 120. For example, when data receptions and data transmissions between the terminal 120 and the wireless network device 110 are performed, the transmission control unit 220 is configured for collecting information of signal strength of the wireless channels. Thus, detailed descriptions are omitted herein.

In an embodiment, the transmission control unit 220 is configured to compute any one of variable parameters stored in the storage unit 210, based on selection information input by the user interface unit, and transmission control unit 220 adjusts transmission characteristics based on computed variable parameters.

In an embodiment, the transmission control unit 220 is configured to determine power efficiency of the terminal 120 when the transmission characteristics are adjusted, according to variable parameters in the storage unit 210. For example, according to determination results, the transmission characteristics are adjusted based on one of variable parameters having maximum power efficiency.

In an embodiment, the transmission control unit 210 is configured to adjust transmission time interval of the connection confirmation data packets in re-transmissions based on computed variable parameters. For example, the transmission control unit 210 adjusts the transmission time intervals by a relationship that the transmission time interval are gradually increased and positively related to a transmission number of the connection confirmation data packets in the re-transmissions.

In an embodiment, the transmission control unit 210 is configured to transmit the connection confirmation data packets at a maximum transmission time interval in a first re-transmission based on computed variable parameters. After the first re-transmission to the wireless network device 110, the transmission control unit 210 is configured to transmit the connection confirmation data packets at a fixed transmission time interval in next re-transmissions.

In an embodiment, the transmission control unit 210 is configured to transmit the connection confirmation data packets at random transmission time intervals in re-transmissions based on computed variable parameters.

In an embodiment, the signal generation unit 230 is configured to generate the connection confirmation data packets based on a control of the transmission control unit 220, and the communication unit 200 is configured to transmit the connection confirmation data packets to the wireless network device 110.

In an embodiment, the user interface unit 240 is configured to receive input signals from a user by using a touch screen or a keyboard. For example, the user interface unit 240 receives selection information related to one of variable parameters stored in the storage unit 210, and transmits the selection information to the transmission control unit 220.

In an embodiment, the timer 250 is configured to count time when the signal generation unit 230 generates the connection confirmation data packets and transmits the connection confirmation data packets to the wireless network device 110.

In an embodiment, the power management unit 260 is configured to manage conversions of a low power mode and an active mode of the terminal 120. As mentioned above, conversions of the low power mode and the active mode are described in the above terminal 120, and detailed descriptions are omitted herein.

Figure 3:
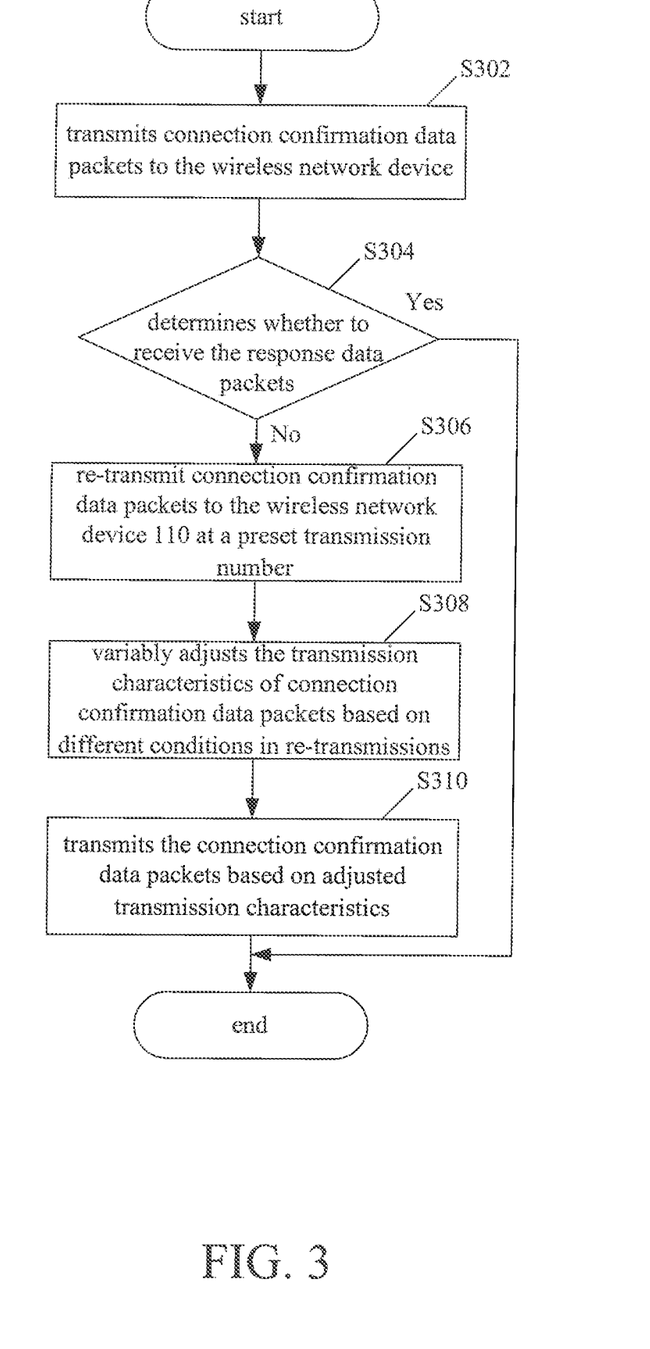
FIG. 3 is an illustrative flowchart of a transmission control method of connection confirmation data packets of the terminal according to one embodiment of the present disclosure.

FIG. 3 is an illustrative flowchart of a transmission control method of connection confirmation data packets of the terminal according to one embodiment of the present disclosure.

At block S302, the terminal 120 transmits connection confirmation data packets to the wireless network device 110. For example, when the wireless network device 110 constructs a data link with the terminal 120, the wireless network device 110 is configured to receive the connection confirmation data packets from the terminal 120 at a fixed period, where the connection confirmation data packets are used to keep data links between the wireless network device 110 and the terminal 120 alive.

At block S304, the terminal 120 determines whether to receive the response data packets corresponding to the connection confirmation data packets from the wireless network device 110.

At block S304, when the terminal 120 receives no response data packet, corresponding to the connection confirmation data packets from the wireless network device 110 based on a detection result, proceed to block S306. At block S306, the terminal 120 is configured to re-transmit connection confirmation data packets to the wireless network device 110 at a preset transmission number based on a determination result.

At block S308, before the terminal 120 re-transmits connection confirmation data packets to the wireless network device 110, the transmission control unit 220 of the terminal 120 variably adjusts the transmission characteristics of connection confirmation data packets based on different conditions in re-transmissions. At block S308, based on the transmission characteristics, the transmission control unit 220 computes variable parameters corresponding to the current conditions and adjusts the transmission characteristics based on the computed variable parameters.

In an embodiment, the terminal 120 is configured to adjust transmission time interval of the connection confirmation data packets in re-transmissions based on computed variable parameters. For example, the terminal 120 adjusts the transmission time interval by a relationship that the transmission time interval is gradually increased and positively related to a transmission number of the connection confirmation data packets in the re-transmissions.

In an embodiment, the terminal 120 is configured to transmit the connection confirmation data packets at a maximum transmission time interval in a first re-transmission based on computed variable parameters. After the first re-transmission, the terminal 120 is configured to transmit the connection confirmation data packets to the wireless network device 110 at a fixed transmission time interval in next re-transmissions.

In an embodiment, the terminal 120 is configured to transmit the connection confirmation data packets to the wireless network device 110 at random transmission time intervals in re-transmissions based on computed variable parameters.

At block S310, the terminal 120 transmits the connection confirmation data packets to the wireless network device based on adjusted transmission characteristics of the block S308.

In an embodiment, the blocks S302-S310 corresponds to elements of the terminal 120, and thus detailed descriptions are omitted herein.

In FIG. 3, blocks S302-S310 are described in order, but are not necessarily limited thereto. For example, blocks S302-S310 are executed by changing their orders, or at least one block is performed, and therefore, FIG. 3 is not limited to a sequential implement sequence.

Figure 4:
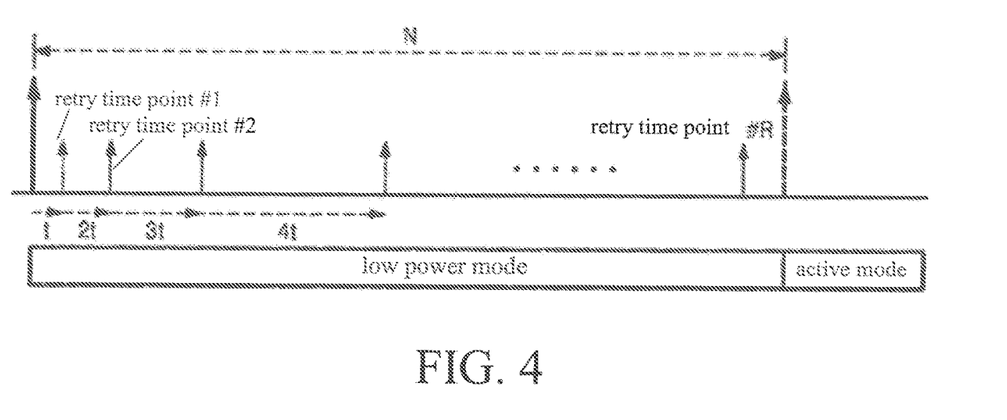
FIGS. 4-6 are illustrative structural diagrams of the transmission control method of connection confirmation data packets of the terminal according to one embodiment of the present disclosure.
Figure 5:
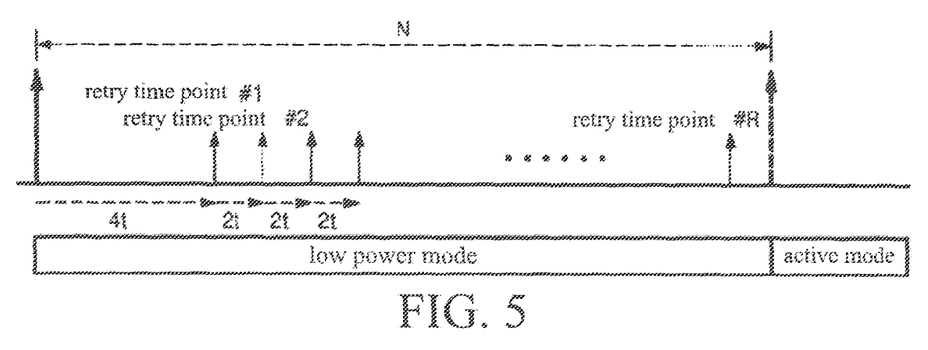
Figure 6:
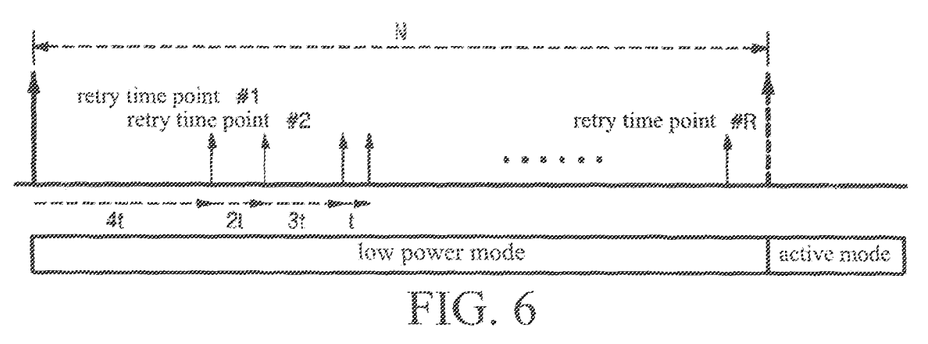

FIGS. 4-6 are illustrative structural diagrams of the transmission control methods of connection confirmation data packets of the terminal 120 according to one embodiment of the present disclosure. In FIGS. 4-6, the terminal 120 are configured to adjust the transmission time interval of the connection confirmation data packets in re-transmissions.

When the connection confirmation data packets are in a transmission period (N), the terminal 120 is configured for temporarily converting the low power mode into an active mode, and transmits the connection confirmation data packets to the wireless network device 110 using the active mode.

When the terminal 120 receives no response data packet from the wireless network device 110, corresponding to the connection confirmation data packets, from the wireless network device 110, the terminal 120 is configured to re-transmit connection confirmation data packets to the wireless network device 110. In other words, the terminal 120 transmits a preset number R of connection confirmation data packets to the wireless network device 110 during the transmission period (N), and the terminal 120 is kept in the low power mode during the transmission period (N).

As described above, under a condition of wireless communication with relatively large dependence on electric wave quality, when terminals operate in burst error having random characteristics, transmission of connection confirmation packets and conversion of the active mode once again occur frequently. Thus, this situation downgrades power consumption efficiency of the terminals that supports the low-power mode.

Embodiments of the present disclosure, the terminal 120 can optionally adjust time intervals (e.g., retry time points #1 to #R) of the connection confirmation data packets that is re-transmitted to the wireless network device 110 for keeping the data link between the wireless network device 110 and the terminal 120, such that the time intervals are not kept at a fixed time but at adjustable time intervals. The terminal 120 can avoid burst errors of a wireless communication, and thus reduces a conversion number of the active mode (e.g., a full active mode), such that the terminal 120 have maximum power consumption efficiency.

In an embodiment of FIG. 4, the terminal 120 adjusts the transmission time intervals, such as 1t, 2t, and 3t, where t is defined as time, by a relationship that the transmission time intervals are gradually increased and positively related to a transmission number of the connection confirmation data packets in the re-transmissions, such that the transmission characteristics of the connection confirmation data packets are properly adjusted.

In an embodiment of FIG. 5, the terminal 120 is configured to transmit the connection confirmation data packets at a maximum transmission time interval in a first re-transmission based on computed variable parameters. After the first re-transmission, the terminal 120 is configured to transmit the connection confirmation data packets to the wireless network device 110 at a fixed transmission time interval in next re-transmissions, such that the transmission characteristics of the connection confirmation data packets are properly adjusted.

In an embodiment of FIG. 6, the terminal 120 is configured to transmit the connection confirmation data packets to the wireless network device 110 at random transmission time intervals in re-transmissions based on computed variable parameters, such that the transmission characteristics of the connection confirmation data packets are properly adjusted.

Figure 7:
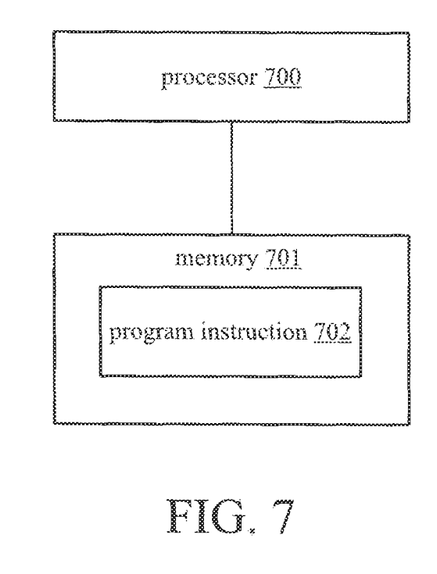
FIG. 7 is an illustrative structural diagram of a terminal of connection confirmation data packets according to one embodiment of the present disclosure.

FIG. 7 is an illustrative structural diagram of a terminal of connection confirmation data packets according to one embodiment of the present disclosure. An terminal of connection confirmation data packets includes at least one processor 700 and a memory (e.g., non-volatile computer storage medium) 701 connected with the at least one processor 700. The memory 701 includes at least one program instruction 702 executable by the at least one processor 700.

The at least one program instruction 702 includes computerized codes of units 200-260 in FIG. 2.

Persons skilled in the related art should be noted that all or part of actions in the above-described embodiments can be implemented by program instructions executable in hardware. The program instructions are stored in computer-readable medium, where the "computer-readable medium" includes flash disks, a read-only memory (ROM), a random access memory (RAM), magnetic devices, and optic devices.

A transmission control method of connection confirmation data packets and an terminal according to the above-mentioned embodiments of the present disclosure are clearly described. As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A terminal, comprising:
   at least one processor;
   a memory connected with the at least one processor, wherein the memory comprises at least one program instruction and the at least one processor executes the at least one program instruction to:
   transmit connection confirmation data packets to a wireless network device, and receive response data packets corresponding to the connection confirmation data packets, wherein the connection confirmation data packets are used to keep data links between the terminal and the wireless network device alive;
   determine whether to receive the response data packets from the wireless network device responsive to the connection confirmation data packets, and re-transmit the connection confirmation data packets to the wireless network device within a preset re-transmission number when the terminal receives no response data packet, such that the terminal adaptively adjusts a transmission characteristic of the connection confirmation data packets, wherein the transmission characteristic is defined as transmission time intervals of the connection confirmation data packets;
   store variable parameters corresponding to the transmission characteristic of the connection confirmation data packets;
   compute the variable parameters based on information of signal strength of wireless channels;
   adaptively adjust the transmission time intervals of the connection confirmation data packets in re-transmissions to the wireless network device based on computed variable parameters, such that the terminal avoids burst errors of a wireless communication; and
   manage one of conversions of a low power mode and an active mode of the terminal, and determine whether data link between the terminal and the wireless network device is kept alive based on a reception of the response data packet, such that the terminal changes a mode from the low-power mode to the active mode.

2. The terminal according to claim 1, wherein the at least one processor further executes the at least one program instruction to:
   determine power efficiency of the terminal when adjusting the transmission characteristic according to variable parameters, and adjust, according to a determination result of the power efficiency, the transmission characteristics based on at least one of variable parameters.

3. The terminal according to claim 1, wherein the at least one processor further executes the at least one program instruction to:
   adjust the transmission time intervals by a relationship that the transmission time intervals are gradually increased and positively related to the preset re-transmission number of the connection confirmation data packets in the re-transmissions.

4. The terminal according to claim 1, wherein the at least one processor further executes the at least one program instruction to:
   transmit the connection confirmation data packets at a maximum transmission time interval in a first re-transmission based on computed variable parameters, and after the first re-transmission, transmit the connection confirmation data packets to the wireless network device at a fixed transmission time interval in next re-transmissions.

5. The terminal according to claim 1, wherein the at least one processor further executes the at least one program instruction to:
   transmit the connection confirmation data packets to the wireless network device at a random transmission time interval in the re-transmissions based on computed variable parameters.

6. A transmission control method of connection confirmation data packets, comprising:
   transmitting, by a terminal, the connection confirmation data packets to a wireless network device, wherein the connection confirmation data packets are used to keep data links between the wireless network device and the terminal alive;
   determining whether to receive the response data packets from the wireless network device responsive to the connection confirmation data packets;
   re-transmitting, by the terminal, the connection confirmation data packets to the wireless network device within a preset re-transmission number when the terminal receives no response data packet from the wireless network device, such that the terminal adaptively adjusts a transmission characteristic of the connection confirmation data packets, and the transmission characteristic is defined as transmission time intervals of the connection confirmation data packets;
   storing variable parameters corresponding to the transmission characteristic of the connection confirmation data packets;
   computing the variable parameters based on information of signal strength of wireless channels;
   adaptively adjusting the transmission time intervals of the connection confirmation data packets in re-transmissions to the wireless network device based on computed variable parameters, such that the terminal avoids burst errors of a wireless communication; and
   managing one of conversions of a low power mode and an active mode of the terminal, and determining whether data link between the terminal and the wireless network device is kept alive based on a reception of the response data packet, such that the terminal changes a mode from the low-power mode to the active mode.

7. The transmission control method of connection confirmation data packets according to claim 6, further comprising:
   adjusting the transmission time intervals by a relationship that the transmission time intervals are gradually increased and positively related to the preset re-transmission number of the connection confirmation data packets in the re-transmissions.

8. The transmission control method of connection confirmation data packets according to claim 6, further comprising:
   transmitting the connection confirmation data packets at a maximum transmission time interval in a first re-transmission based on computed variable parameters, and after the first re-transmission, transmitting the connection confirmation data packets to the wireless network device at a fixed transmission time interval in next re-transmissions.

9. The transmission control method of connection confirmation data packets according to claim 6, further comprising:
   transmitting the connection confirmation data packets to the wireless network device at a random transmission time interval in the re-transmissions based on computed variable parameters.

\* \* \* \* \*